(12) United States Patent
Mang et al.

(10) Patent No.: US 6,407,225 B1
(45) Date of Patent: Jun. 18, 2002

(54) COMPOSITIONS COMPRISING HYDROXY-FUNCTIONAL POLYMERS

(75) Inventors: Michael N. Mang, Midland, MI (US); Jerry E. White, Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/077,654

(22) PCT Filed: Dec. 19, 1996

(86) PCT No.: PCT/US96/20194

§ 371 (c)(1),
(2), (4) Date: Jun. 2, 1998

(87) PCT Pub. No.: WO97/23564

PCT Pub. Date: Jul. 3, 1997

Related U.S. Application Data

(60) Provisional application No. 60/009,022, filed on Dec. 21, 1995.

(51) Int. Cl.[7] ............................. C07H 1/00; B29D 22/00

(52) U.S. Cl. .................. 536/123.1; 524/47; 524/52; 524/53; 528/99; 528/97; 428/35.2

(58) Field of Search ............................. 524/47, 52, 53; 528/99, 97; 536/123.1

(56) References Cited

U.S. PATENT DOCUMENTS

| 5,095,054 A | * | 3/1992 | Lay et al. ...................... 524/47 |
| 5,275,853 A | * | 1/1994 | Silvis et al. ................ 428/35.4 |
| 5,464,924 A | * | 11/1995 | Silvis et al. ................ 528/102 |
| 5,962,093 A | * | 10/1999 | White et al. ................ 428/35.2 |

* cited by examiner

Primary Examiner—James O. Wilson
Assistant Examiner—Howard V Owens, Jr.
(74) Attorney, Agent, or Firm—Nemia C. Damocles

(57) ABSTRACT

Compositions comprising a polysaccharide and a hydroxy-functional polyester are prepared by mixing the hydroxy-functional polyester and polysaccharide, modified polysaccharide or a naturally-occurring fiber or particulate filler and, optionally, other additives in a intensive mixer at a temperature and for a time sufficient to provide an intimate, well-dispersed mixture of the components.

29 Claims, No Drawings

COMPOSITIONS COMPRISING HYDROXY-FUNCTIONAL POLYMERS

CROSS REFERENCE TO A RELATED APPLICATION

This application claims the benefit of U.S. Provisional Application No. 60/009,022, filed Dec. 21, 1995.

BACKGROUND OF THE INVENTION

This invention relates to compositions comprising hydroxy-functional polymers and to articles prepared therefrom.

Polysaccharides are inexpensive and have good mechanical properties, but cannot be easily processed as thermoplastics. To take advantage of their low cost, attempts have been made to blend them with synthetic polymers, such as polyolefins, to produce more useful materials. However, the resulting materials often suffer from several problems. For example, the physical properties of the blend of the polysaccharide starch with polyolefin are adversely affected by the incompatibility of and poor adhesion between the polar starch and the non-polar polyolefin. In order to solve this problem, the starch must be modified, or compatibilized with the polyolefin, thereby increasing the cost of the blend. When more polar thermoplastics are employed in the preparation of the blend, other physical properties such as moisture resistance can be adversely affected. It would be desirable to provide a composition having useful mechanical properties comprising a polysaccharide and another hydroxy-functional polymer which is compatible therewith.

SUMMARY OF THE INVENTION

The present invention is a composition comprising (1) a polysaccharide, a modified polysaccharide or a naturally-occurring fiber or particulate filler and (2) a thermoplastic hydroxy-functional polyether derived from monomers containing 1 or more epoxy groups.

The hydroxy-functional polyether has been found to adhere strongly to a polysaccharide. This adhesion, and the generally good physical properties of hydroxy-functional polyethers, allows for the preparation of hitherto unknown materials with useful physical properties.

The compositions of the present invention are suitable for use in fabricating molded, extruded or foamed articles, containers, films, film laminates, or coatings using conventional fabricating techniques such as extrusion, compression molding, injection molding, blow molding and similar fabrication techniques commonly used to produce such articles. Examples of such articles include films, foams, sheets, pipes, rods, bags, boxes, meat trays, egg cartons, cups and plates, cutlery, and other disposable consumer items. The compositions of the present invention are also suitable for use as adhesives and encapsulating agents.

DETAILED DESCRIPTION OF THE INVENTION

Preferably, the hydroxy-functional polyethers employed in the practice of the present invention are:
(1) hydroxy functional polyethers having repeating units represented by the formula:

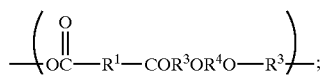

(2) hydroxy-functional polyethers having repeating units represented by the formula:

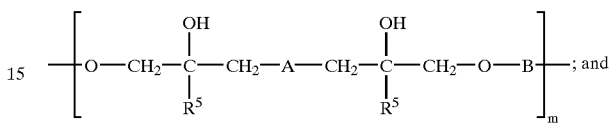

(3) hydroxy-functional polyethers having repeating units represented by the formula:

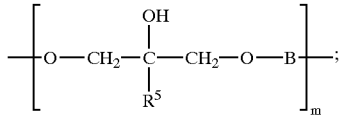

wherein $R^1$ individually represents a divalent organic moiety which is predominantly hydrocarbylene, or a combination of different organic moieties which are predominantly hydrocarbylene: $R^3$ is

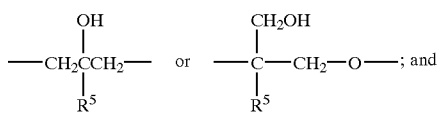

$R^4$ is

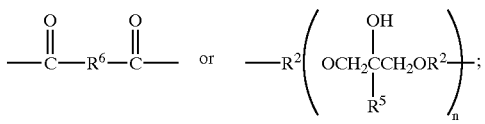

wherein $R^2$ is a divalent organic moiety which is predominantly hydrocarbylene or

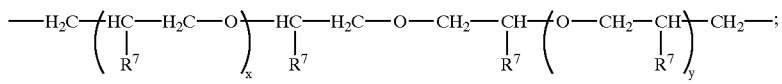

$R^5$ is hydrogen or alkyl, $R^6$ is independently an organic moiety which is predominantly hydrocarbylene, $R^7$ is independently hydrogen or methyl, A is an amine moiety or a combination of different amine moieties; B is a divalent organic moiety which is predominantly hydrocarbylene; m is an integer from 10 to about 1000, n is an integer from about 0 to about 100, and x and y are independently integers from 0 to 100.

The term "predominantly hydrocarbylene" is defined as a divalent radical that is predominantly hydrocarbon, but which optionally contains a minor amount of a heteroatomic moiety such as oxygen, sulfur, imino, sulfonyl, and sulfoxyl.

Representative divalent organic moieties useful as $R^1$, $R^2$ and $R^6$ include alkylene, cycloalkylene, alkylenearylene, poly(alkyleneoxyalkylene), alkylenethioalkylene, alkylenesulfonylalkylene, alkylene substituted with at least one hydroxyl group, cycloalkylene substituted with at least one hydroxyl group, alkylenearylene substituted with at least one hydroxyl group, poly(alkyleneoxyalkylene) substituted with at least one hydroxyl group, alkylenethioalkylene substituted with at least one hydroxyl group, alkylenesulfonylalkylene substituted with at least one hydroxyl group; arylene, dialkylenearylene, diaryleneketone, diarylenesulfone, diarylene oxide and diarylene sulfide.

In the more preferred hydroxy-functional polyethers, $R^1$, $R^2$ and $R^6$ are independently methylene, ethylene, propylene, butylene, pentamethylene, hexamethylene, heptamethylene, octamethylene, nonamethylene, decamethylene, dodecamethylene, 1,4-cyclohexylene, 1,3-cyclohexylene or 1,2-cyclohexylene optionally substituted with at least one hydroxyl group, p-phenylene, m-phenylene, or 2,6-naphthalene, diphenyleneisopropylidene, sulfonyldiphenylene, carbonyldiphenylene, oxydiphenylene, or 9,9-fluorenediphenylene and n is from 0 to 10.

Preferably, A is 2-hydroxyethylimino-, 2-hydroxypropylimino-, piperazenyl, N,N'-bis(2-hydroxyethyl)-1,2-ethylenediimino-, and B is isopropylidenediphenylene, 1,3-phenylene, or 1,4-phenylene, and $R^5$ is hydrogen.

The poly(hydroxy ester ethers) represented by Formula I are prepared by reacting diglycidyl esters of aliphatic or aromatic diacids such as diglycidyl terephthalate, or diglycidyl ethers of dihydric phenols or alcohols with aliphatic or aromatic diacids such as adipic or terephtalic acid as described in U.S. Pat. Nos. 5,171,820 and 5,496,910; and copending U.S. Patent application Ser. Nos. 131,110, filed Oct. 1, 1993; 278,361, filed Jul. 21, 1994; and 280,425, filed Jul. 26, 1994.

The poly(hydroxy amino ethers) represented by Formula II are prepared by contacting one or more of the diglycidyl ethers of a dihydric phenol with an amine having two amine hydrogens under conditions sufficient to cause the amine moieties to react with epoxy moieties to form a polymer backbone having amine linkages, ether linkages and pendant hydroxyl moieties. These polyethers are described in U.S. Pat. No. 5,275,853. These polyethers can also be prepared by contacting a diglycidyl ether or an epihalohydrin with a difunctional amine.

The poly(hydroxy ethers) represented by Formula III can be prepared by contacting a diglycidyl ether or a combination of diglycidyl ethers with a dihydric phenol or combination of dihydric phenols using the process described in U.S. Pat. No. 5,164,472. Alternatively, the poly(hydroxy ethers) are obtained by allowing a dihydric phenol or a combination of dihydric phenols to react with an epihalohydrin by the process described by Reinking, Barnabeo, and Hale in the *Journal of Applied Polymer Science*, Volume 7, page 2135 (1963).

While the amount of hydroxy-functional polyethers used depends on a variety of factors, including the specific polymer employed and the desired end uses of the composition, in general, the hydroxy-functional polyesters can be present in an amount of from 1 to 99 weight percent, preferably from 10 to 95 weight percent and, most preferably from 20 to 90 weight percent, based on the total weight of the hydroxy-functional polyester and polysaccharide.

The naturally-occurring fibers or particulate fillers which can be employed in the practice of the present invention for preparing the composition are, for example, wood flour, wood pulp, wood fibers, cotton, flax, hemp, or ramie fibers, rice or wheat straw, chitin, chitosan, cellulose materials derived from agricultural products, nut shell flour, corn cob flour, and mixtures thereof. Polysaccharides which can be employed in the practice of the present invention for preparing the composition are the different starches, celluloses, hemicelluloses, xylanes, gums, pectins and pullulans. Polysaccharides are known and are described, for example, in *Encyclopedia of Polymer Science and Technology*, 2nd edition, 1987. The preferred polysaccharides are starch and cellulose.

Modified polysaccharides which can be employed in the practice of the present invention for preparing the composition are the esters and ethers of polysaccharides, such as, for example, cellulose ethers and cellulose esters, or starch esters and starch ethers. Modified polysaccharides are known and are described, for example, in *Encyclopedia of Polymer Science and Technology*, $2^{nd}$ edition, 1987

The term "starch" as used herein, refers to carbohydrates of natural, vegetable origin, composed mainly of amylose and/or amylopectin, and includes unmodified starches, physically modified starches, such as thermoplastic, gelatinized or cooked starches, starches with a modified acid value (pH) where acid has been added to lower the acid value of a starch to a range of from 3 to 6, gelatinized starches, ungelatinized starches, cross-linked starches and disrupted starches (starches which are not in particulate form). The starches can be in granular, particulate or powder form. They can be extracted from various plants, such as, for example, potatoes, rice, tapioca, corn, pea, and cereals such as rye, oats, and wheat.

Celluloses are known and are described, for example, in *Encyclopedia of Polymer Science and Technology*, 2nd edition, 1987. Celluloses are natural carbonhydrate high polymers (polysaccharides) consisting of anhydroglucose units joined by an oxygen linkage to form long molecular chains that are essentially linear. Cellulose can be hydrolyzed to form glucose. The degree of polymerization ranges from 1000 for wood pulp to 3500 for cotton fiber, giving a molecular weight of from 160,000 to 560,000. Cellulose can be extracted from vegetable tissue (wood, grass, and cotton). Celluloses can be used in the form of fibers.

The composition of the present invention may also contain various additives such as, for example, plasticizers, lubricants, pigments, foaming agents, extenders, stabilizers, chemical modifiers, and flow accelerators. Each of these additives is known and several types of each are commercially available.

In general, the compositions of the present invention can be prepared by mixing (1) a thermoplastic hydroxy-functional polyether and (2) a polysaccharide, a modified polysaccharide or a naturally-occurring fiber or particulate filler and, optionally (3) other additives in an intensive mixer, such as a Haake mixer, a Banbury mixer, single-screw extruder, twin-screw extruder, or an injection-molding machine, at a temperature and for a time sufficient to provide an intimate, well-dispersed mixture of the components. Preferably, the components are brought together and processed in an appropriate melt extruder from which the blend is extruded in the form of powder or strands. The powders or strands are then pelletized or formed into granules for injection molding and other thermal processes. Standard techniques and apparatuses well known in the art can be used for these processes.

The material can be fabricated into films using processes well known to those skilled in the art, such as by cast film extrusion, blown film extrusion, and can be incorporated in multilayer constructions such as coextruded cast or blown films, with or without intermediate adhesive layers or layers containing recycled scrap material from the fabrication process.

The material can be extruded into shapes such as profiles, tubes, rods, strips, tapes, sheets, or strands, and may be further formed by molding using well known methods such as compression or injection molding, or thermoforming or vacuum molding.

The material may be in the form of a foam or cellular structure, as a flexible, rigid, or structural foam, with open, closed, or partially opened-cellular morphologies. The foam can be conveniently formed by extrusion, or by expansion of beads into a heated mold to form a shaped article. The extruded foam may be further formed by thermoforming into shaped articles. The foam may also be directly extruded into useful shapes such as rods, slabs, planks, or boards. The articles and shapes so formed are useful, for example, for packaging, insulation, and cushioning purposes.

The foam of the present invention is generally prepared by heating the composition comprising a polysaccharide, a modified polysaccharide, a naturally occurring fiber or particulate filler, and hydroxy-functional polyether to form a plasticized or molten polymer material, incorporating a blowing agent to form a foamable gel, and extruding the gel through a die to form the foam product. The blowing agent can be incorporated into the polymer material before melting, or may be incorporated after the polymer material is heated to a temperature at or above its melting point. The blowing agent may be incorporated or mixed into the melt polymer material by any means known in the art such as with an extruder, mixer, or blender. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel is then extruded through a die of desired shape to a zone of lower or reduced pressure than that in which the gel is maintained prior to extrusion through the die. The lower pressure may be superatmospheric or subatmospheric, but is preferably at an atmospheric level.

Blowing agents useful in making the present foam structures include inorganic agents, organic blowing agents, and chemical blowing agents. Suitable inorganic blowing agents include carbon dioxide, nitrogen, argon, water, air, and helium. Organic blowing agents include aliphatic hydrocarbons having 1 to 9 carbon atoms and fully and partially halogenated aliphatic hydrocarbons having 1 to 4 carbon atoms.

The present foam has the density from 5 to 200 kilograms per cubic meter. The foam has an average cell size from 0.1 to 5.0 millimeters. The foam may be open or closed-cell.

Though the preferred process for making the present foam is an extrusion process, it is understood that the above structure may be formed by the expansion of beads, which may be molded at the time of expansion to form structures of various shapes.

The composition of the present invention is also useful as hot-melt adhesives, and can be formulated with tackifying resins, plasticizers, waxes, and/or conventional additives in varying amounts as are known to those skilled in the art.

The composition may be fabricated into a container using conventional processes such as blow molding, injection molding, vacuum forming, thermoforming, injection blow molding, extrusion blow molding, and pultrusion.

The composition can be used as a coating or a laminate, and can be applied to a substrate by methods such as calendering, curtain coating, extrusion coating, roll coating, or spray coating.

The composition can be used as an encapsulant capable of slow or controlled release of a pharmacologically active agent, a catalyst, a biocide or a fertilizer, and can be prepared by compounding the material with, as an additional component, the pharmacologically active agent, the biocide, the fertilizer, or the fertilizer, either during or after the composition is prepared. In the case of active materials that might not be stable under the processing conditions employed to produce the composition, the composition of the invention can be applied to particles of the active agent by spray coating, solution coating, or other well known methods to produce the encapsulated active ingredient.

The composition may also be in the form of a substrate comprising a polysaccharide, such as wood, paper, textile, or a starch article, optionally containing a hydroxy-functional polyether derived from monomers containing one or more epoxy groups, coated with a hydroxy-functional polyether derived from monomers containing one or more epoxy groups. The hydroxy-functional polyether can be used to modify the surface or structural properties of the substrate, to protect the substrate in use. The coating can be conventionally applied using well known methods such as extrusion, calendering, pressure lamination, roll coating, powder coating, curtain coating, or solution coating. The substrate is preferably a paper, cardboard, cellulose film, modified cellulose film, starch film, a modified starch film, wood, or a film or an article comprising a polysaccharide, a modified polysaccharide, a naturally occurring fiber or particulate filler, and a hydroxy-functional polyether. The substrate is most preferably paper, cardboard, or an article comprising a polysaccharide, a modified polysaccharide, a naturally occurring fiber or particulate filler, and a hydroxy-functional polyether.

The following working examples are given to illustrate the invention and should not be construed as limiting its scope. Unless otherwise indicated, all parts and percentages are by weight.

EXAMPLE 1

A 13 L resin kettle, equipped with a mechanical stirrer and nitrogen inlet, was charged with hydroquinone diglycidyl ether (1312.5 g, 5.8 mol, 113.06 g/equivalent epoxide), 1,10-decanedicarboxylic acid (1343.5 g, 5.83 mol), and tetra-n-butylammonium bromide (94.2 g, 0.29 mol). Diglyme (3 L) was added and the mixture heated to 110° C. for 5.5 hours under an atmosphere of nitrogen. Glacial acetic acid (250 mL) was added and heating at 110° C. was continued overnight. The solution was allowed to cool to about 50° C. and was poured into water in a large WARING™ blender (300 mL portions into 2 L of water). The fibrous precipitate was collected by suction filtration and suspended in fresh water for 3 days. The product was collected by suction filtration and allowed to air-dry overnight. The product is dried in a vacuum oven at 100° C. to 115° C. overnight. The polymer had an inherent viscosity of 0.42 dL/g (DMF, 25° C., 0.5 g/dL), a $T_g$ of 5° C., and a $T_m$ of 75° C.

Dry blends of the above polymer and unmodified potato starch were prepared using the weight ratios indicated in the table. The blends were compounded using a HAAKE™ mixer (60 cc bowl) at 120° C. for 6 minutes as indicated. Plaques (4 inch by 4 inch by 1/16 inch) were prepared by compression molding the material obtained from the HAAKE™ mixer. Specimens for mechanical property testing were obtained from these plaques. Selected tensile properties are listed in Table 1.

TABLE I

Mechanical Properties of Starch-Poly(ester ether) Blends

| Mech Properties | Control (0% Starch) | 20% Starch | 40% Starch | 60% Starch | 80% Starch |
|---|---|---|---|---|---|
| Yield Stress (PSI) | 880 | 940 | 1130 | 1340 | — |
| Yield Strain (%) | 15 | 12 | 9 | 8 | — |
| Tensile Strength (psi) | 3050 | 1840 | 870 | 1080 | 2210 |
| Tensile Elongation (%) | 705 | 370 | 190 | 14 | 6 |
| Tensile Modulus (psi) | 12240 | 16640 | 29690 | 45210 | 96510 |

EXAMPLE 2

The poly(hydroxy amino ether) derived from the reaction of the diglycidyl ether of bisphenol A with ethanolamine was compounded with varying amounts of hardwood flour (American Wood Fibers grade 20010) using a mechanical BRABENDER™ PLASTI-CORDER™ plasticity meter with roller blades in a nominal 60 cc counter-rotating mixer head at 180° C. The polymer was loaded and processed at 63 rpm for two minutes, then the hardwood flour was added and processed under the conditions shown in Table II.

TABLE II

| Example number | Weight % wood flour | Minutes Processed | Final torque (m-g) |
|---|---|---|---|
| 2(a) | 10 | 5 | 2500 |
| 2(b) | 30 | 3 | 3200 |
| 2(c) | 50 | 2 | 4500 |

The compounded materials were compression-molded into test plaques using a 4 inch by 4 inch by 1/16 inch thick frame mold chase between two flat stainless steel plates using an aerosol fluorocarbon mold release agent, commercially available as Fluoroglyde™ CP from Norton Performance Plastic Company FLUOROGLIDE™ CP fluoropolymer spray film lubricant. The material was molded at 200° C. for 3 minutes using 1250 psi on the mold cavity. The plaque was cooled under pressure to below 45° C. before demolding. ASTM Type IV tensile test bars were machined from these plaques and tested using an Instron 4507 testing frame at a crosshead speed of 0.2 inch/minute. The test results are shown in Table III.

TABLE III

| Example number | Tensile strength at break (psi) | % Elongation at break | Tensile modulus (psi) |
|---|---|---|---|
| 2(a) | 6500 | 10.6 | 522,000 |
| 2(b) | 10,300 | 3.5 | 670,000 |
| 2(c) | 11,100 | 2.2 | 813,000 |

EXAMPLE 3

The poly(hydroxy ester ether) derived from the reaction of the diglycidyl ether of bisphenol A with adipic acid was compounded with various levels of hardwood flour (American Wood Fibers grade 20010) using a mechanical BRABENDER™ PLASTI-CORDER™ plasticity meter with roller blades in a nominal 60 cc counter-rotating mixer head at 150° C. The polymer was loaded and processed at 63 rpm for two minutes, then the wood flour was added and processed under the conditions shown in Table IV.

TABLE IV

| Example number | Weight % wood flour | Minutes processed | Final torque (m-g) |
|---|---|---|---|
| 3(a) | 10 | 3 | 400 |
| 3(b) | 30 | 5 | 520 |
| 3(c) | 50 | 5 | 1500 |

The compounded materials were compression-molded into test plaques using a 4 inch by 4 inch by 1/16 inch thick frame mold chase between two flat stainless steel plates using FLUOROGLIDE™ CP fluoropolymer spray film lubricant as a mold release. The Examples 3(a) and 3(b) materials were molded at 150° C. for 3 minutes using 1125–1250 psi on the mold cavity. The Example 3(c) material was molded at 175° C. The plaques were cooled under pressure to below 30° C. before demolding. ASTM Type IV tensile test bars are machined from these plaques and tested using an INSTRON™ 4507 testing frame at a crosshead speed of 0.2 inch/minute. The results of the test are shown in Table V.

TABLE V

| Example number | Tensile strength at break (psi) | % Elongation at break | Tensile modulus (psi) |
|---|---|---|---|
| 3(a) | 3300 | 13.6 | 451,000 |
| 3(b) | 5700 | 4.5 | 648,000 |
| 3(c) | 7800 | 2.0 | 843,000 |

EXAMPLE 4

The poly(hydroxy ether) of bisphenol A (35 g, PAPHEN™ PHENOXY RESIN PKHHMM from Phenoxy Associates) was compounded with 15 grams of dried corn starch using a HAAKE™ Rheocord 9000 torque rheometer equipped with a Haake Model 600 mixer using roller blades at a bowl temperature of 160° C. The polymer and starch were loaded and processed at 60 rpm for ten minutes. The torque and melt temperature equilibrated at a torque of about 1650 m-g at 183° C. after about 5 minutes.

The compounded material was compression-molded into test plaques using a 4 inch by 4 inch by 1/16 inch thick frame mold chase between two flat stainless steel plates using FLUOROGLIDE™ CP Fluoropolymer spray film lubricant as (a product of Norton Performance Plastic Company) an aerosol fluorocarbon mold release agent. The material was molded at 200° C. for 3 minutes using 625 psi on the mold cavity. The plaque was then cooled under pressure to below 45° C. before demolding. ASTM Type IV tensile test bars were machined from these plaques and tested as in Example 1. The test results are shown in Table VI

TABLE VI

| Tensile strength at break (psi) | % Elongation at break | Tensile modulus (psi) |
| --- | --- | --- |
| 8431 | 2.47 | 499,600 |

EXAMPLE 5

The poly(hydroxy amino ether) derived from the reaction of the diglycidly ether of bisphenol A with ethanolamine (35 g) was compounded with 15 grams of dried corn starch (Buffalo 3401) using a HAAKE™ RHEOCORD™ 9000 torque rheometer equipped with a HAAKE™ Model 600 mixer using roller blades at a bowl temperature of 160° C. The polymer and starch were loaded and processed at 60 rpm for ten minutes. The torque and melt temperature equilibrated at a torque of about 1500 m-g at 183° C. after about 5 minutes.

The compounded material was compression -olded into test plaques using a 4 inch by 4 inch by 1/16 inch thick frame mold chase between two flat stainless steel plates using FLUOROGLIDE™ CP fluoropolymer spray film lubricant as a mold release agent. The material was molded at 200° C. for 3 minutes using 625 psi on the mold cavity. The plaque was then cooled under pressure to below 45° C. before demolding. ASTM Type IV tensile test bars are machined from these plaques and tested as in Example 1. The test results are shown in Table VII.

TABLE VII

| Tensile strength at break (psi) | % Elongation at break | Tensile modulus (psi) |
| --- | --- | --- |
| 8134 | 2.75 | 551,000 |

The data above indicate that addition of starch to a hydroxy-functional polyether in accordance with the present invention produces materials having useful mechanical properties.

What is claimed is:

1. A composition of matter comprising (1) a polysaccharide, a modified polysaccharide, excluding a destructurized starch or a naturally occurring fiber or particulate filler and (2) a thermoplastic hydroxy-functionalized polyetheramine having repeating units represented by the formula:

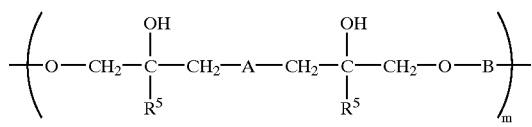

wherein $R^5$ is hydrogen or alkyl; A is an amine moiety or a combination of different amine moieties; B is a divalent organic moiety which is predominantly hydrocarbylene; and m is an integer from 10 to 1000.

2. Films fabricated from the composition of claim 1.

3. A multilayer laminate comprising at least one layer of the composition of claim 1 and at least one layer of a recycled scrap of films comprising said composition.

4. The composition of claim 1, wherein $R^5$ is hydrogen.

5. The composition of claim 1 wherein A is 2-hydroxyethylimino-, 2-hydroxypropylimino-, piperazenyl, N,N'-bis(2-hydroxyethyl)-1,2-ethylenediimino-, and B is isopropylidenediphenylene, 1,3-phenylene, or 1,4-phenylene, and $R^5$ is hydrogen.

6. The composition of claim 1, wherein B is isopropylidenediphenylene 1,3-phenylene, or 1,4-phenylene, and $R^5$ is hydrogen.

7. The composition of claim 1, wherein the thermoplastic hydroxy-functional polyether is derived from the reaction of an epihalohydrn and a bisphenol.

8. The composition of claim 1, wherein the polysaccharide is a starch or a cellulose.

9. The composition of claim 8, wherein the starch is derived from potato, rice, corn or wheat.

10. The composition of claim 8, wherein the starch is a granular starch, and the cellulose is in the form of a fiber.

11. The composition of claim 8, wherein the starch is a thermoplastic starch.

12. The composition of claim 8, wherein the cellulose is extracted from wood pulp or cotton fibers.

13. The composition of claim 1, wherein the modified polysaccharide is an ether or an ester of the polysaccharide.

14. The composition of claim 13, wherein the modified polysaccharide is a cellulose ether or cellulose ester.

15. The composition of claim 1, wherein the naturally-occurring fiber or particulate filler is wood flour, wood pulp, wood fibers, cotton, flax, hemp, or ramie fibers, rice or wheat straw, chitin, chitosan, cellulose materials derived from agricultural products, nut shell flour, corn cob flour, or mixtures thereof.

16. The composition of claim 1, wherein the thermoplastic hydroxy-functional polyether is present in an amount of from 1 to 99 weight percent, and the polysaccharide, a modified polysaccharide, or a naturally-occurring fiber or particulate filler is present in an amount of from 99 to 1 weight percent, based on the weight of the two components.

17. The composition of claim 1, in the form of a film.

18. The composition of claim 1, in the form of a molded or extruded article.

19. The composition of claim 1, in the form of an open-cell or closed cell foam.

20. The composition of claim 1, in the form of an adhesive.

21. The composition of claim 1, in the form of a rigid or flexible container.

22. The composition of claim 1, in the form of a packaging material.

23. The composition of claim 1, in the form of a coating.

24. The composition of claim 1, in the form of a laminate.

25. The composition of claim 1, in the form of an encapsulant capable of slow or controlled release of a pharmacologically active agent, a catalyst, a biocide or a fertilizer.

26. An article comprising a substrate of a polysaccharide coated with the thermoplastic hydroxy-functionalized polyetheramine defined in claim 1.

27. The article of claim 26, in which the polysaccharide is a paper product.

28. A laminate comprising the thermoplastic hydroxy-functionalized polyetheramine defined in claim 1 bonded to a substrate comprising paper, cardboard, cellulose film, modified cellulose film, starch film, modified starch film, or wood.

29. A process for preparing a blend which comprises mixing the thermoplastic hydroxy-functionalized polyetheramine defined in claim 1 with a polysaccharide, modified polysaccharide, or naturally-occurring fiber or particulate filler in an intensive mixer at a temperature and for a time sufficient to provide a well-dispersed mixture of the components.

* * * * *